United States Patent [19]

Vollenwyder et al.

[11] Patent Number: 5,258,671
[45] Date of Patent: Nov. 2, 1993

[54] COOLING STRUCTURE FOR LINEAR INDUCTION MOTOR

[75] Inventors: Kurt Vollenwyder, Kingston, Canada; David C. Gilmore, Taipei, Taiwan; John Stannard, Kingston, Canada

[73] Assignee: UTDC Inc., Kingston, Canada

[21] Appl. No.: 873,641

[22] Filed: Apr. 23, 1992

Related U.S. Application Data

[63] Continuation of Ser. No. 667,588, Mar. 11, 1991, abandoned.

[30] Foreign Application Priority Data

Jan. 16, 1991 [CA] Canada .................................. 2034277

[51] Int. Cl.$^5$ ............................................. H02K 41/02
[52] U.S. Cl. ......................................... 310/12; 104/290
[58] Field of Search ............................... 310/12, 13, 14; 104/290

[56] References Cited

U.S. PATENT DOCUMENTS

| | | | |
|---|---|---|---|
| 3,460,485 | 8/1969 | Easton | 104/148 |
| 3,668,444 | 6/1972 | Davey | 310/13 |
| 3,835,339 | 9/1974 | Laronze | 310/13 |
| 4,131,812 | 12/1978 | English | 310/13 |
| 4,598,223 | 7/1986 | Glennon et al. | 310/260 |
| 4,642,493 | 2/1987 | Wallace | 310/13 |

FOREIGN PATENT DOCUMENTS

| | | |
|---|---|---|
| 0174783 | 8/1985 | European Pat. Off. |
| 67169 | 9/1967 | Fed. Rep. of Germany |
| 49-125802 | 10/1974 | Japan |
| 50-34319 | 4/1975 | Japan |
| 5437207 | 8/1977 | Japan |
| 5556446 | 10/1978 | Japan |
| 55-37514 | 3/1980 | Japan |
| 55-43325 | 3/1980 | Japan |
| 61-76043 | 4/1986 | Japan |
| 63-283460 | 11/1988 | Japan |
| 2-97266 | 4/1990 | Japan |

*Primary Examiner*—Steven L. Stephan
*Assistant Examiner*—Judson H. Jones
*Attorney, Agent, or Firm*—Baker & Daniels

[57] ABSTRACT

A primary of a linear induction motor has a plenum formed on its upper surface to receive cooling air from a fan. The upper surface of the core is formed with fins to promote cooling. Air flows from the plenum to side housings in which the end turns are located. A deflector plate directs air from the plenum over the end turns of the windings. Exhaust slots are provided in the housing above the end turns and a baffle between the housing and the end turns promotes flow through the end turns as it moves toward the exhaust slots.

18 Claims, 4 Drawing Sheets

COOLING STRUCTURE FOR LINEAR INDUCTION MOTOR

This is a continuation of application Ser. No. 07/667,588, filed Mar. 11, 1991 now abandoned.

The present invention relates to linear induction motors and in particular to a means to improve cooling thereof.

Linear induction motors are widely used in a number of industries and present certain advantages over rotary motors, particularly where propulsion along a predetermined path or guideway is required. An application in which linear induction motors have enjoyed commercial success is the transportation industry where they have been used to provide the propulsion system for transit vehicles.

The constraints placed on the design of the linear induction motor in these particular applications have required that careful attention be paid to cooling of the motor. This is because the motor has to be located within a relatively congested area of the vehicle and at the same time must be appropriately shielded to permit its use in a public environment.

U.S. Pat. No. 4,642,493 issued Nov. 10, 1987 and assigned to the assignee of the present application addresses the issue of providing adequate cooling for the end turns of the windings of the linear induction motor. This is provided by locating fans outward of the central core to force air over the end turns of the motor. This approach has been successful in improving the performance of the linear induction motor, although it is desirable to provide for further extraction of the heat generated during operation particularly in the central core of the motor.

It is therefore an object of the present invention to provide an improved cooling system for a linear induction motor.

According to the present invention, there is provided a primary for a linear induction motor comprising a core having a plurality of slots in one face thereof, a housing on each side of said core, motor windings located in said slots and having end turns extending laterally beyond said core and into said housing, a plenum chamber on the opposite side of said core to said one face, a fan to supply cooling air to the plenum chamber, apertures in longitudinal surfaces of said plenum adjacent the opposite surface of said core to permit air to flow out of said plenum and into said housings, deflector means overlying said apertures to direct air onto the end turns and outlet means in said housing to permit egress of air from the housing.

In a preferred embodiment, the fins extend from the opposite side of the core in a direction parallel to the slots and are formed as castellations of individual laminations that constitute the core. In this manner, increased surface area and adequate ducting of the cooling air is provided.

An embodiment of the invention will now be described by way of example only with reference to the accompanying drawings, in which FIG. 1 is a perspective view of a linear induction motor primary;

Figure 1:
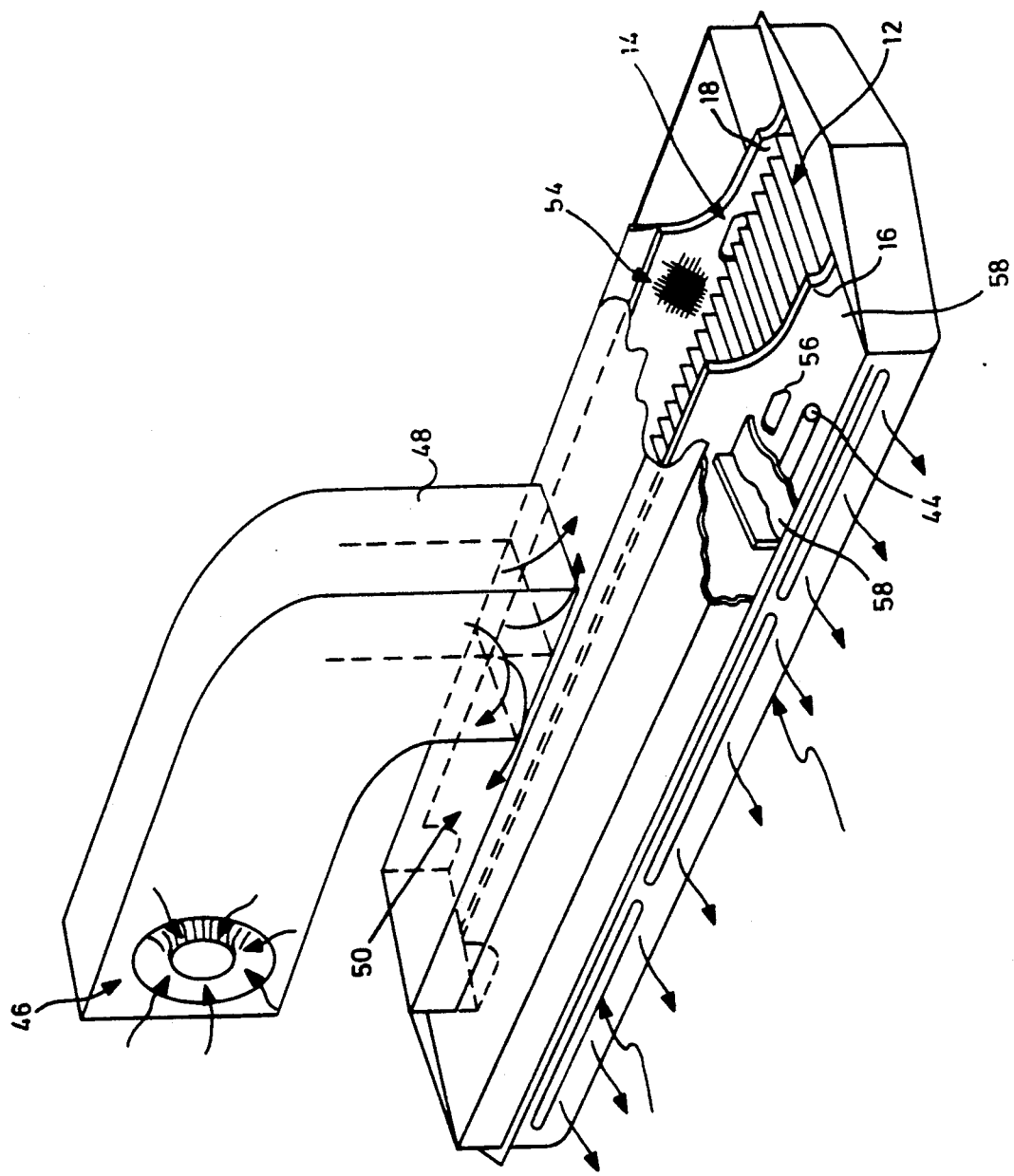
Figure 2:
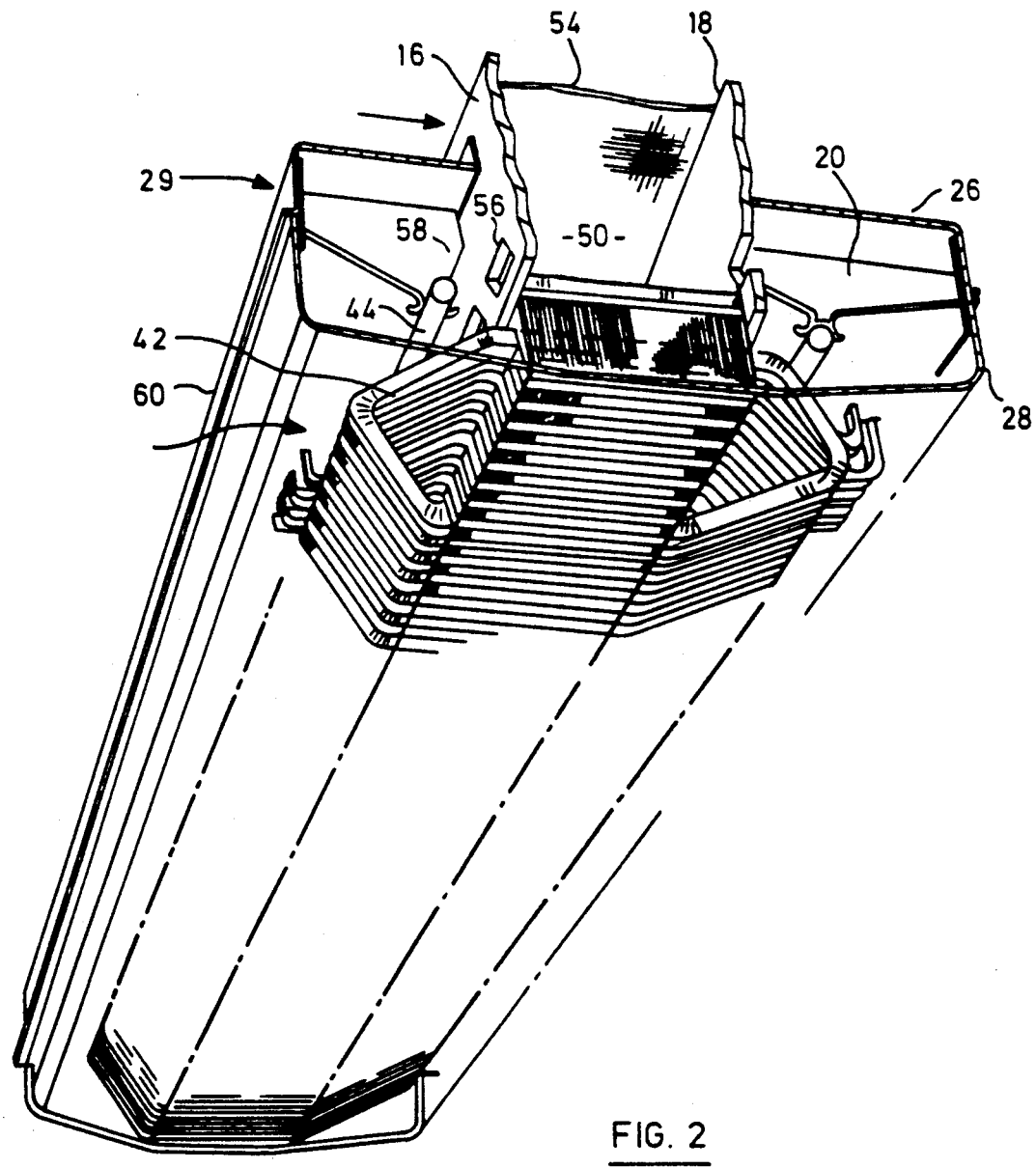
FIG. 2 is a perspective view of the motor of FIG. 1 taken from the underside with portions removed for clarity.
Figure 3:
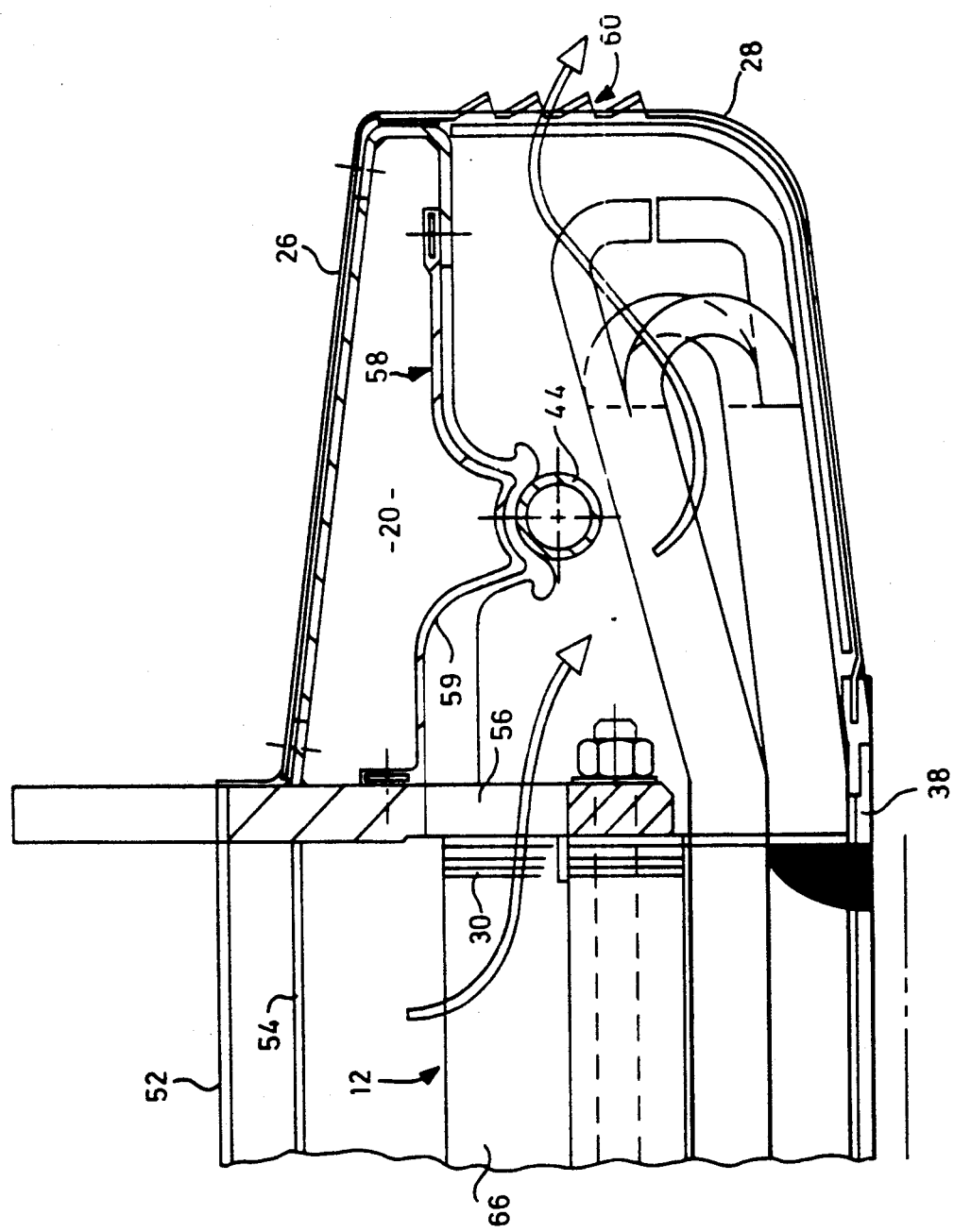
FIG. 3 is a view on the line 3—3 of FIG. 1.

Referring now to FIGS. 1-3, a primary of a linear induction motor 10 comprises a core 12 supported in a frame 14 for attachment to the underside of vehicle (not shown). The frame 14 comprises a pair of longitudinal frame members 16,18 and outriggers 20 extending laterally from each side of the frame members 16,18. Outriggers 20 serve to support the side covers 26,28 that define a housing 29 on either side of the core 12.

The core 12 is formed from a plurality of longitudinal extending laminations 30 which are secured to the frame members 16,18 by bolts 32. The bolts 32 are located at spaced intervals along the length of the frame members 16,18 and serve to hold the laminations in close proximity. As can best be seen in FIG. 4, each of the laminations 30 has a series of rectangular slots 34 spaced along its length to accomodate motor windings 36. The windings 36 are helically wound in a three-phase winding as more fully described in the above referenced U.S. Pat. No. 4,642,493. The windings 36 are secured within the slots 34 by keys 38 co-operating with dovetail formations 40 at the lower end of each of the slots 34. As can be seen in FIG. 2, each of the windings 36 projects laterally beyond the core 12 and has direction reversing end turns 42 supported within the covers 26,28 by a circular longitudinal bar 44 secured to the outriggers 20.

Referring once again to FIG. 1, a fan 46 is mounted above the core 12 and between the frame members 16,18 and serves to provide cooling air to the upper surface of the core 12. Fan 46 delivers cooling air through a duct 48 into a plenum 50 extending the length of the primary. Duct 48 is located as close to the centre of the core 12 as practical to assist in uniform air distribution. Plenum 50 is defined between the frame members 16,18, the upper surface of core 12, and a cover 52. A diffuser screen 54 is located in the plenum between the upper surface of core 12 and the cover 52 to distribute uniformly air delivered through the duct 48.

The side frames 16,18 each have a series of apertures 56 uniformly spaced along the length of the primary and allowing communication between the plenum 50 and housing 29. In order to provide cooling flow of air over the end turns 42, a deflector plate 58 is located between each outrigger and extends from the side frames 16,18 to the side covers 26,28. The baffle 58 has a portion 59 extending outwardly and downwardly from the respective frame members 16,18. The portion 59 extends from above and across the apertures 56 so that air passing through the apertures is deflected downwardly between the end turns. Baffle 58 is supported between the outriggers 20 by the bar 44 that cooperates with the baffle 58 to provide a barrier extending the length of the core 12. This ensures that air passing through the apertures 56 passes between the end turns 42 before exiting the housing by elongate exhaust slots 60 in the side cover 28. The location of the slots causes the air to flow upwardly and outwardly from the housing 28 and at the same time inhibits ingress of water and dust. Baffle 58 and bar 44 are formed from a nonconducting material such as fibreglass laminations.

Figure 4:
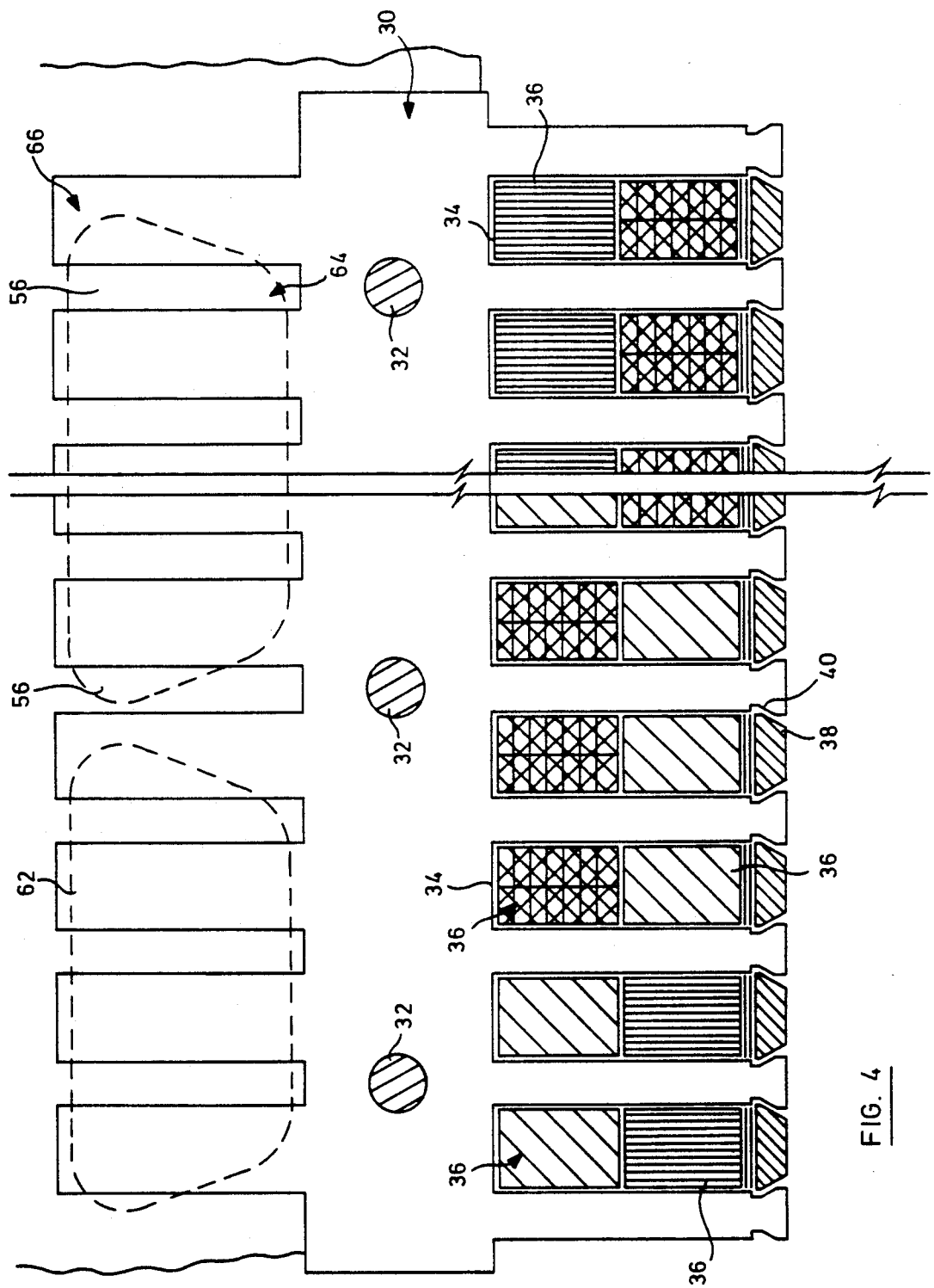
FIG. 4 is a view on the line 4—4 of FIG. 3.

To promote efficient cooling of the core 12 and as may be seen in FIG. 4, each of the laminations 30 is formed with a castellated edge 62. Accordingly, when the laminations 30 are assembled and installed between the frame members 16,18, alternating transversely extending passageways 64 and fins 66 are formed in a direction parallel to the slots 34. The castellations 62 provide an increased surface area for the upper surface of the core 12 and direct air to flow through the passageways 64 toward the apertures 56. Apertures 56 are positioned to overlap the fins 66 and thereby cause the air to flow along the passageways 64 to the housing.

In operation, therefore, air supplied from the fan 42 is uniformly distributed over the upper surface of core 12 by the diffuser. The surface area of the core 12 is increased by fins 66 to improve the heat transfer to the air that flows out of plenum and into the housing 29 through apertures 56. The efficient cooling of end turns 44 is provided by the deflector plates 58 which cause the air to pass between the end turns as it moves to the exit slots 60.

We claim:

1. A primary for a linear induction motor comprising a core having a plurality of slots in one face thereof, a housing on each side of said core, motor windings located in said slots and having end turns extending laterally beyond said core and into said housing, a plenum chamber on the opposite side of said core to said one face, a fan to supply cooling air to the plenum chamber, apertures in longitudinal surfaces of said plenum adjacent the opposite surface of said core to permit air to flow out of said plenum and into said housing, deflector means overlying said apertures to direct air onto the end turns, and outlet means in said housing to permit egress of air from the housing, wherein said deflector means includes an inclined portion extending from said aperture toward said end turns.

2. A primary according to claim 1 wherein said deflector portion is located between outriggers extending laterally from said core to support said housing.

3. A primary according to claim 2 wherein laterally extending fins are provided on said opposite face of said core.

4. A primary according to claim 3 wherein said apertures overlap said fins to permit air flow from said plenum between said fins.

5. A primary according to claim 4 wherein said inclined plate extends outwardly and downwardly from above said apertures.

6. A primary according to claim 1 wherein a diffuser is provided in said plenum to distribute uniformly air from the fan along the core.

7. A primary according to claim 1 wherein laterally extending fins are provided on said opposite face.

8. A primary according to claim 7 wherein said core is formed from laminations and said fins are integrally formed along one edge of said laminations.

9. A primary for a linear induction motor comprising a core having a plurality of slots in one face thereof, a housing on each side of said core, motor windings located in said slots and having end turns extending laterally beyond said core and into said housing, a plenum chamber on the opposite side of said core to said one face, a fan to supply cooling air to the plenum chamber, apertures in longitudinal surfaces of said plenum adjacent the opposite surface of said core to permit air to flow out of said plenum and into said housings, deflector means overlying said apertures to direct air onto the end turns, and outlet means in said housing to permit egress of air from the housing, wherein laterally extending fins are provided on said opposite face, and wherein the outlet means are located above said end turns.

10. A primary according to claim 9 wherein a diffuser is provided in said plenum to distribute uniformly air from the fan along the core.

11. A primary according to claim 9 wherein said core is formed from laminations and said fins are integrally formed along one edge of said laminations.

12. A primary for a linear induction motor comprising a core having a plurality of slots in one face thereof, a housing on each side of said core, motor windings located in said slots and having end turns extending laterally beyond said core and into said housing, a plenum chamber on the opposite side of said core to said one face, a fan to supply cooling air to the plenum chamber, apertures in longitudinal surfaces of said plenum adjacent the opposite surface of said core to permit air to flow out of said plenum and into said housings, deflector means overlying said apertures to direct air onto the end turns, and outlet means in said housing to permit egress of air from the housing, wherein laterally extending fins are provided on said opposite face, said fins extending beyond said apertures.

13. A primary according to claim 12 wherein a diffuser is provided in said plenum to distribute uniformly air from the fan along the core.

14. A primary according to claim 12 wherein said core is formed from laminations and said fins are integrally formed along one edge of said laminations.

15. A primary for a linear induction motor comprising a core having a plurality of slots in one face thereof, a housing on each side of said core, motor windings located in said slots and having end turns extending laterally beyond said core and into said housing, a plenum chamber on the opposite side of said core to said one face, a fan to supply cooling air to the plenum chamber, apertures in longitudinal surfaces of said plenum adjacent the opposite surface of said core to permit air to flow out of said plenum and into said housings, deflector means overlying said apertures to direct air onto the end turns, and outlet means in said housing to permit egress of air from the housing, wherein a barrier extends along said housing adjacent said end turns and said deflector means extends to the barrier to cause air to flow between said end turns.

16. A primary according to claim 15 wherein a diffuser is provided in said plenum to distribute uniformly air from the fan along the core.

17. A primary according to claim 15 wherein laterally extending fins are provided on said opposite face.

18. A primary according to claim 17 wherein said core is formed from laminations and said fins are integrally formed along one edge of said laminations.

* * * * *